(12) United States Patent
Krenz

(10) Patent No.: US 8,823,205 B2
(45) Date of Patent: Sep. 2, 2014

(54) INTELLIGENT ELECTRICAL POWER DISTRIBUTION SYSTEM

(75) Inventor: Michael Krenz, Roscoe, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 522 days.

(21) Appl. No.: 13/162,853

(22) Filed: Jun. 17, 2011

(65) Prior Publication Data

US 2012/0319469 A1 Dec. 20, 2012

(51) Int. Cl.
*B60L 1/00* (2006.01)
(52) U.S. Cl.
USPC ............................................. 307/9.1
(58) Field of Classification Search
USPC ............................................. 307/9.1
See application file for complete search history.

(56) References Cited

U.S. PATENT DOCUMENTS

| | | | |
|---|---|---|---|
| 5,363,323 A | 11/1994 | Lange | |
| 2011/0184579 A1* | 7/2011 | Nilsen et al. | 700/295 |

FOREIGN PATENT DOCUMENTS

WO WO0171881 A2 9/2001

OTHER PUBLICATIONS

Office Action, dated Mar. 20, 2014, for Chinese Patent Application No. 201210197748.6, 13 pages.

* cited by examiner

*Primary Examiner* — Robert L. Deberadinis
(74) *Attorney, Agent, or Firm* — Kinney & Lange, P.A.

(57) ABSTRACT

An intelligent power distribution system distributes power on a vehicle. The system includes at least a first power source and a second power source for supplying electrical power, and at least a first power block and a second power block, each connected to receive power from the first power source and the second power source. Each power block includes at least one load and a power selector having a first input for receiving power from the first power source and a second power source and an output for supplying power from either the first power source or the second power source to the at least one load. The power selector selects either the first power source or the second power source for provision to the at least one load based on characteristics of the at least one load.

15 Claims, 3 Drawing Sheets

INTELLIGENT ELECTRICAL POWER DISTRIBUTION SYSTEM

BACKGROUND

The present invention is related to power distribution systems, and in particular to intelligent power distribution systems.

Electrical power distribution systems employed in vehicles such as aircraft provide for the redundant distribution of power from a plurality of power sources to a plurality of loads. Each load is associated with one of a plurality of power distribution buses, which in turn is connected to one of the plurality of power sources. The system is redundant in that if one of the power sources fails, another one of the plurality of power sources can be used to supply the power distribution bus with power. In this power distribution topology, all loads connected to a particular power bus are supplied with power from a single power source.

However, a drawback of this topology is some loads create transients on the power distribution bus that can adversely affect the loads connected to the same power distribution bus. Typically, large (and therefore expensive) filters are required to reduce the effects of those transients.

SUMMARY

An intelligent power distribution system for distribution power on an aircraft, includes at least a first power source and a second power source for supplying electrical power, and at least a first power block and a second power block, each connected to receive power from the first power source and the second power source. Each power block includes at least one load and a power selector having a first input for receiving power from the first power source and a second power source and an output for supplying power from either the first power source or the second power source to the at least one load. The power selector selects either the first power source or the second power source for provision to the at least one load based on characteristics of the at least one load.

DETAILED DESCRIPTION

The power distribution system of the present invention provides for the intelligent distribution of power to various loads onboard a vehicle. A benefit of this approach is it allows for the intelligent isolation of "noisy" loads from "clean" loads.

Figure 1:
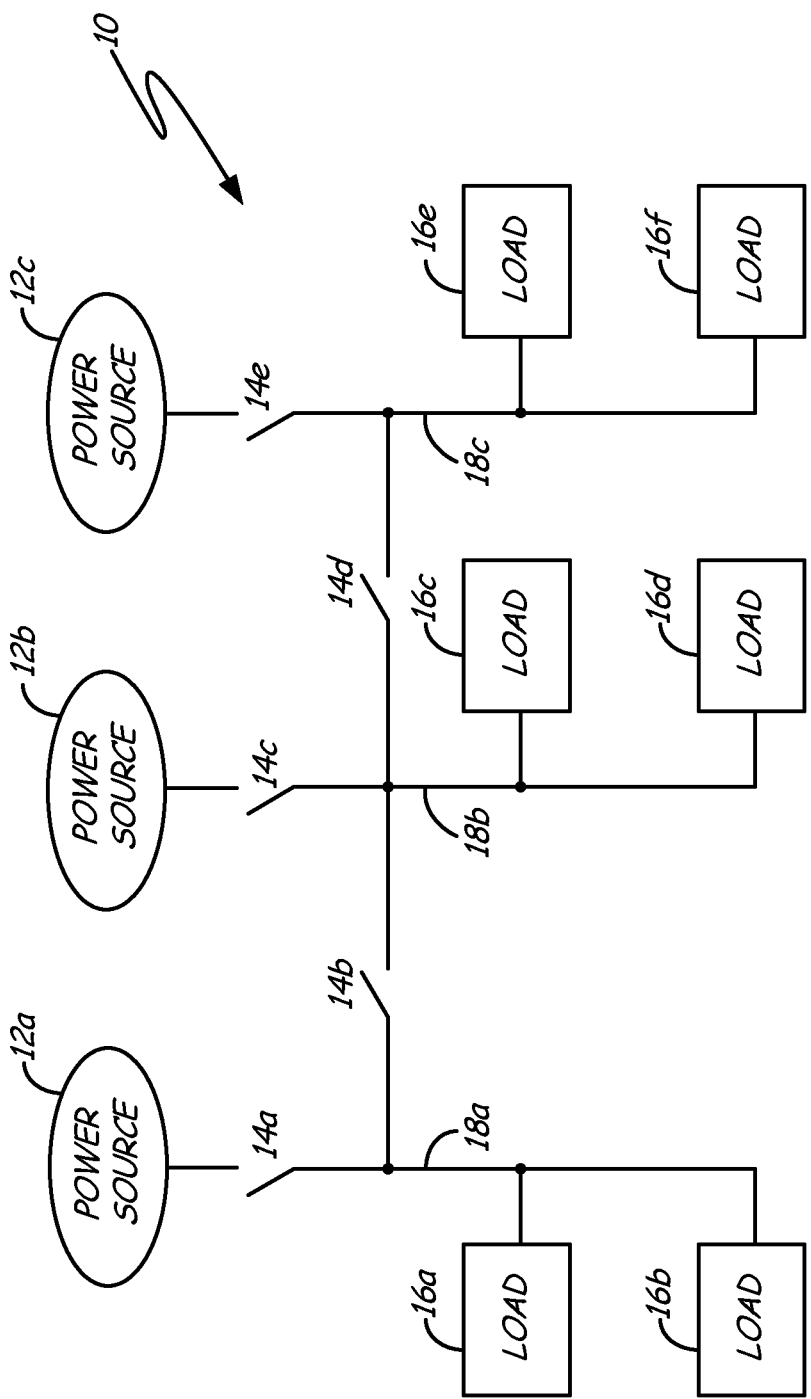
FIG. 1 is a circuit diagram of a power distribution system as known in the prior art.

FIG. 1 is a circuit diagram of power distribution system 10 as known in the prior art. Power distribution system 10 includes power sources 12a-12c, contactors 14a-14e, loads 16a-16f, and power distribution buses 18a-18c. Power supplied by power sources 12a-12c is distributed via selective control of contactors 14a-14e to power distribution buses 18a-18c for supply to loads 16a-16f. In this type of power distribution architecture, loads 16a-16f draw power from whichever power source 12-12c is presently supplying power to the power distribution bus 18a-18c with which the load is associated. For example, loads 16a and 16b are associated with power bus 18a, and will therefore draw power from whichever power source 12a-12c is configured to supply power to power distribution bus 18a.

The benefit of this long-utilized power distribution topology is it provides power supply redundancy to each of the plurality of loads. For example, power source 12a supplies power to power distribution bus 18a through selective control of contactors 14a and 14b (i.e., by closing contactor 14a and opening contactor 14b). In the event power source 12a fails, power source 12b may be employed to supply power to power distribution bus 18a by selectively closing contactor 14b (and typically opening contactor 14a).

However, this power distribution topology requires that load 16a and 16b (as well as load pairs 16c, 16d and load pairs 16e, 16f) be sourced with power from the same power source. In the event that one of the loads (e.g., load 16a) is a "noisy" load that creates a lot of distortion on power distribution bus 18a, those distortions are communicated to the loads sharing the same power distribution bus.

Figure 2:
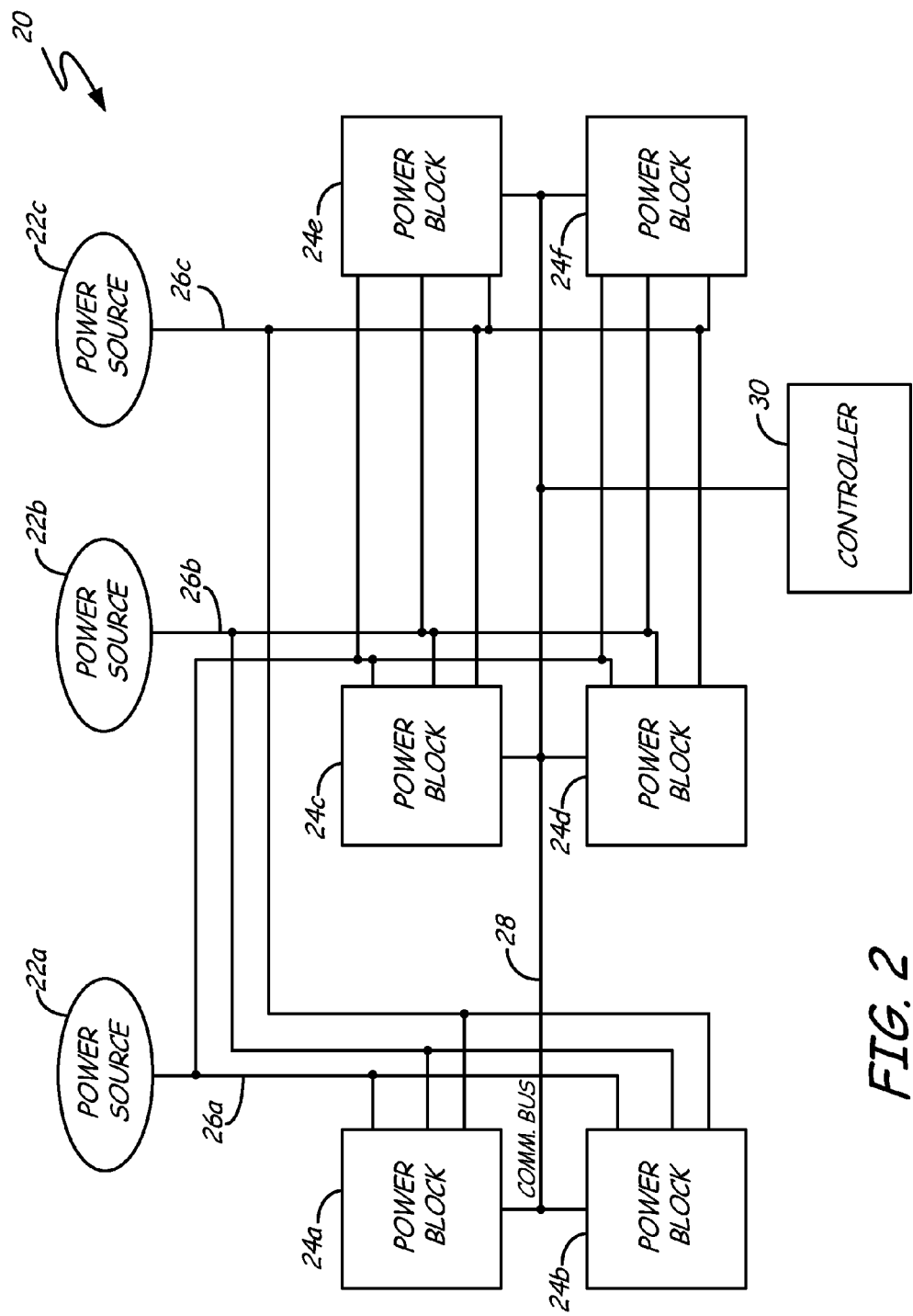
FIG. 2 is a circuit diagram of a power distribution system according to an embodiment of the present invention.

FIG. 2 is a circuit diagram of power distribution system 20 according to an embodiment of the present invention. Power distribution system 20 includes a plurality power sources 22a-22c, power blocks 24a-24f and power distribution buses 26a-26c. Each of the plurality of power blocks 24a-24f is connected to receive power from each of the plurality of power distribution buses 26a-26c, and therefore each power block 24a-24c is capable of receiving power from any one of the plurality of power sources 22a, 22c. For purposes of this description, loads associated with power blocks 24a, 24c, and 24e are classified as "noisy" (i.e., loads with varying energy consumption in terms of varying current, electromagnetic interference, and/or power factor), while loads associated with power blocks 24b, 24d, and 24f are described as "clean" (i.e., loads with consistent energy consumption in terms of current flow, electromagnetic interference and/or power factor).

Each power block 24a-24f is therefore capable of drawing power from any one of the plurality of power sources 22a-22c. For example, power block 24a is connected to each of the plurality of power sources 22a-22c, and may selectively draw power from one of the plurality of power sources. This is in contrast with the power distribution system described with respect to FIG. 1, in which each load 16a-16f was restricted to drawing power from the power bus to which it was connected, and as a result from whichever power source was providing power to the power bus associated with the load. A benefit of power distribution system 20 is "noisy" loads associated with power blocks 24a, 24c, and 24e can be configured to draw power from one of the plurality of power sources (e.g., power source 22a) while "clean" loads associated with power blocks 24b, 24d, and 24f can be configured to draw power from a different power source (e.g., power source 22c). In this way, "noisy" loads 24a, 24c, and 24e do not adversely affect "clean" loads 24b, 24d, and 24f.

In one embodiment, each of the plurality of power blocks 24a-24f is pre-programmed with information regarding the type of load (e.g., "noisy" or "clean") to which it is connected, and based on this a priori information determines the appropriate power source 22a-22c from which it should draw power. In another embodiment, rather than program power blocks 24a-24f with information about the type of load to which it is connected, each power block is programmed with information about the power source 22a-22c from which it should draw power. In both of these embodiments, prior knowledge of the system architecture (i.e., the loads which will be connected to each power block) is required to program power blocks 24a-24f.

In addition, each power block 24a-24f may further include information regarding what power sources to connect to in the event the current power source fails or becomes unavailable. For example, power blocks 24a, 24c and 24e associated with "noisy" loads may be programmed to selectively draw power from power source 22b in the event power source 22a becomes unavailable.

In the embodiment shown in FIG. 2, each power block 24a-24f is connected to communication bus 28 for communicating with other power blocks 24a-24f and/or with controller 30. Communication between controller 30 and the plurality of power blocks 24a-24f may include information regarding the type of load (e.g., "noisy", "clean", etc.) associated with each power block and the power source 22a-22c from which the power block is currently drawing power. This information is used by controller 30 to make determinations regarding from which power supply 22a-22c each power block 24a-24f should draw power. Communication between power blocks 24a-24f and controller 30 may be used in conjunction with a priori programming such that controller 30 of each power block 24a-24f to coordinate power source selections in the event one or more power sources becomes unavailable, or may be used in place of a priori programming such that controller 30 dynamically determines the power source 22a-22c from which each power block 24a-24f will draw power. A benefit of this approach is it allows power distribution system 20 to dynamically respond to changing load conditions. For example, the load associated with power block 24a may initially be classified as a "clean" load and be assigned to draw power from power source 22c. During operation, the load associated with power block 24a may become "noisy". Power block 24a monitors the power drawn and communicates the change in load characteristics to controller 30. In response, controller 30 may instruct power block 24a to connect to a different power source (e.g., power sources 22a-22c) reserved for "noisy" loads.

Classification of a load (e.g., classifying a load as either "noisy" or "clean") may be done locally by each of the power blocks 24a-24f based on monitored characteristics of the load, or may be done centrally by controller 30 based on information communicated from each of plurality of power blocks 24a-24f. Classification of loads associated with each of the power blocks may be based on monitoring of voltage, current, power and/or combinations thereof.

In one embodiment, control of each of the plurality of power blocks 24a-24f is centralized in controller 30, which receives inputs from each of the plurality of power blocks 24a-24f and in response provides instructions/commands to each of the plurality of power blocks 24a-24f regarding the power source 22a-22c from which the power block should draw power. In another embodiment, control of each of the plurality of power blocks 24a-24f is distributed among the plurality of power blocks, with no centralized controller. In this embodiment, power blocks 24a-24f communicate via communication bus 28 with one another, and determine in a distributed manner the power sources 22a-22c from which each of the plurality of power blocks 24a-24f should draw power.

Figure 3:
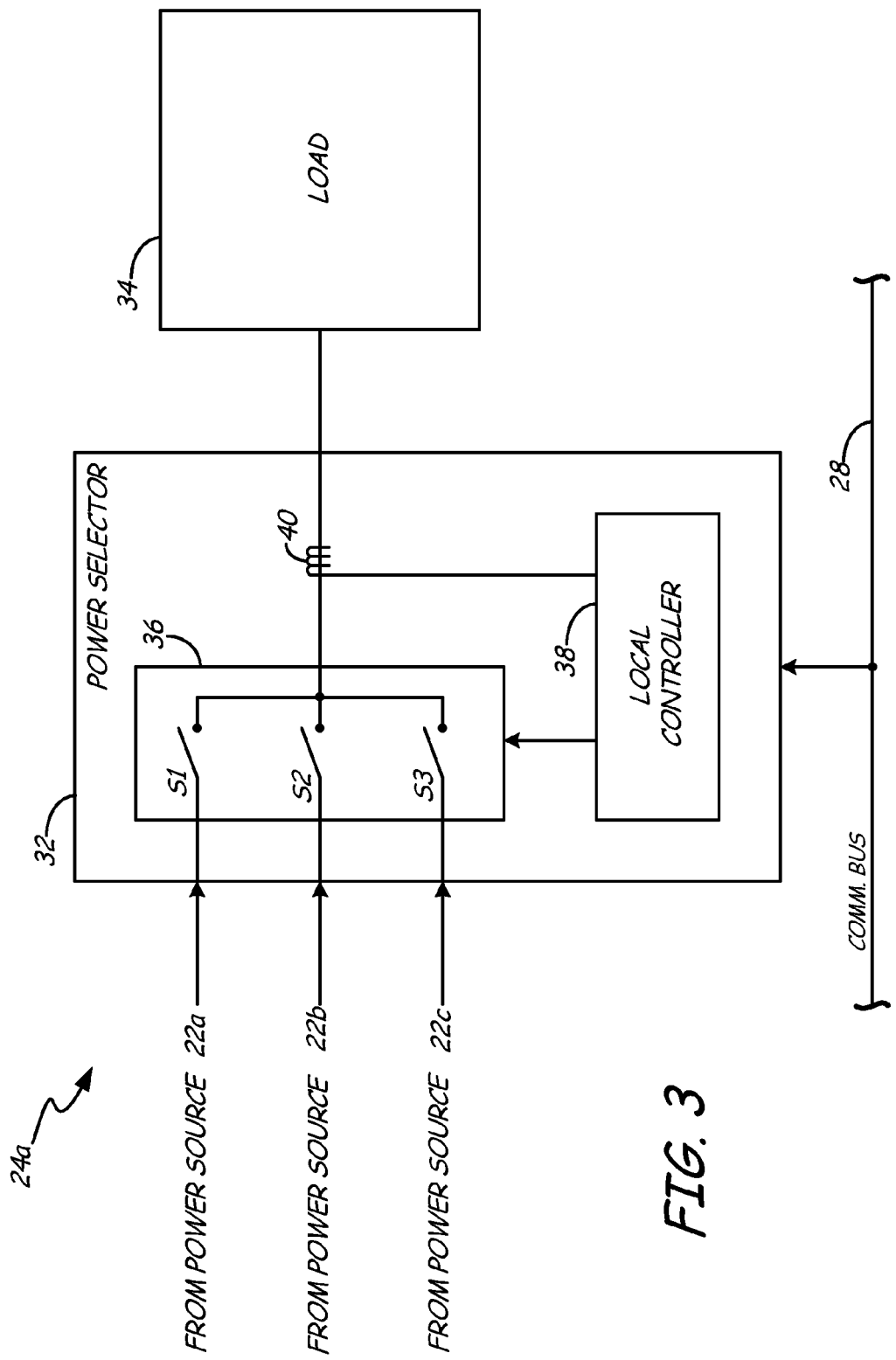
FIG. 3 is a circuit diagram of a power block according to an embodiment of the present invention.

FIG. 3 is a circuit diagram of power block 24a according to an embodiment of the present invention. In the embodiment shown in FIG. 3, power block 24a includes power selector 32 and load 34. Power selector 32, in turn, includes switch matrix 36, local controller 38 and sensor 40.

Power from each of the plurality of available power sources 22a-22c is provided as an input to power selector 32. Within power selector 32, switch matrix 36 includes a plurality of inputs for receiving power from each of the plurality of available power sources 22a-22c, an output for providing one of the plurality of power sources 22a-22c to load 34, and a plurality of switches S1-S3 selectively controlled by local controller 38 to determine the power source 22a-22c provided to load 34. Various switches and switch configurations may be employed to apply one of the plurality of power sources 22a-22c as an output to load 34. For example, switches may make use of electro-mechanical switches, such as relays, or solid-state switch devices such as metal-oxide semiconductor field-effect transistors (MOSFETs), insulated gate bipolar transistors (IGBTs), and silicon carbide (SiC) switches. Likewise, various switch configurations may be employed to multiplex power from the input of switch matrix 36 to the output of switch matrix 36.

In one embodiment, local controller 38 is programmed with a priori information regarding the type of load 34 to which it is connected (e.g., "noisy", "clean") and/or the power source 22a-22c to be used to supply power to load 34. In this embodiment, while local controller 38 may communicate with other power blocks 24b-24f, the selection of power to be supplied to load 34 is predetermined based on knowledge of the load and the power source 22a-22c selected to source particular types of loads.

In other embodiments, local controller 38 communicates with controller 30 (and/or other power blocks 24a-24f) to dynamically determine the appropriate power source to provide to load 34. Communication provided by local controller 38 may include characteristics of the load as monitored by sensor 40, determinations made by local controller 38 regarding whether the load is "noisy" or "clean," and the power source 22a-22c presently connected to supply power to load 34. In response, local controller 38 receives commands/instructions from controller 30 (and/or power blocks 24b-24f) selecting a power source 22a-22c to supply to load 34.

In the embodiment shown in FIG. 3, sensor 40 is a current sensor configured to monitor current supplied to load 34. Detected transients in the monitored current are indicative of a "noisy" load and can be used to classify a load as either "noisy" or "clean". The monitored current characteristics can be communicated to controller 30 or may be processed locally by local controller 38 to classify the load (e.g., as either "noisy" or "clean"). If processed locally, then the classification of the load is communicated by local controller 38 to controller 30. In other embodiments, other types of sensors may be employed to monitor other characteristics (e.g., voltage, power) of the power being supplied to load 34. Local controller 38 receives the monitored characteristics, and based on the monitored characteristics determines whether the load is "noisy" or "clean".

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An intelligent electrical power distribution system for distributing power on a vehicle the electrical power distribution system comprising:
   at least a first power source and a second power source for supplying electrical power;
   at least a first power block and a second power block, each connected to both the first power source and the second power source, each power block comprising:
   at least one load; and
   a power selector having a first input for receiving power from the first power source and a second input for receiving power from the second power source, and an output for supplying power from either the first power source or the second power source to the at least one load, wherein the power selector selects either the first power source or the second power source based on characteristics of the at least one load;
   wherein the characteristics of the at least one load include current, and at least one of: electromagnetic interference properties and power factor.

2. The intelligent electrical power distribution system of claim 1, wherein the electrical power distribution system further includes:
   a controller connected to communicate with the first power block and a second power block, wherein the controller receives information from the first and second power blocks regarding characteristics of the at least one load associated with each power block and in response provides commands selecting the power source to be provided to the at least one load associated with each power block.

3. The intelligent electrical power distribution system of claim 2, wherein each power block determines based on the characteristics of the at least one load whether the at least one load is "noisy" or "clean".

4. The intelligent electrical power distribution system of claim 3, wherein information received by the controller from the first and second power blocks regarding characteristics of the at least one load associated with each power block includes whether the at least one load is "noisy" or "clean", wherein the controller provides commands selecting the power source to be provided to the at least one load associated with each power block based on whether the at least one load is "noisy" or "clean".

5. The intelligent electrical power distribution system of claim 1, wherein each power selector further includes:
   a switch matrix having a plurality of switches for selectively connecting either the first input or the second input to the output; and
   a local controller connected to control the plurality of switches included within the switch matrix.

6. The intelligent electrical power distribution system of claim 5, wherein the local controller is programmed with information regarding the power source to provide to the load based on characteristics of the at least one load associated with each power block.

7. The intelligent electrical power distribution system of claim 5, wherein each power selector further includes a sensor for monitoring characteristics of the at least one load associated with the power block used to determine the power source to provide to the at least one load associated with each power block.

8. A power selector for use in an intelligent power distribution system to distribute power from one of a plurality of power sources to at least one load, the power selector comprising:
   a switch matrix having a plurality of switches for selectively connecting one of the plurality of power sources provided as inputs to the switch matrix to an output of the switch matrix for provision to the load; and
   a local controller connected to control the plurality of switches included within the switch matrix to select the power source provided as an output of the switch matrix, wherein the power source selected for provision to the load is selected based on characteristics of the at least one load associated with the power selector;
   wherein the characteristics of the at least one load include current, and at least one of: electromagnetic interference properties and power factor.

9. The power selector of claim 8, wherein characteristics of the at least one load are pre-programmed based on a priori information regarding the at least one load connected to the power selector.

10. The power selector of claim 8, further including:
    a sensor connected to monitor characteristics of the at least one load, wherein based on the monitored characteristics the local controller determines the power source to be provided to the at least one load.

11. The power selector of claim 8, wherein characteristics of the at least one load includes determinations of whether the load is "noisy" or "clean".

12. The power selector of claim 8, wherein the local controller communicates characteristics of the at least one load to a central controller and receives commands from the central controller selecting the power source to be provided to the at least one load.

13. An intelligent power distribution system for distributing power on a vehicle, the system comprising:
    a plurality of power sources for generating electrical energy;
    a plurality of power blocks each connected to the plurality of power sources for selectively applying one of the plurality of power sources to a load associated with each of the plurality of power blocks; and
    a controller connected to communicate with the plurality of power blocks and to provide commands to each of the plurality of power blocks regarding selection of the power source to be provided to the at least one load associated with each power block;
    wherein each of the plurality of power blocks characterizes the at least one load connected to the power block based on one or more characteristics of the load, the characteristics of the at least one load including current, and at least one of: electromagnetic interference properties and power factor.

14. The intelligent power distribution system of claim 13, wherein each of the plurality of power blocks monitors the one or more characteristics of the at least one load.

15. The intelligent power distribution system of claim 14, wherein each of the plurality of power blocks characterizes the at least one load as either "noisy" or "clean" based on the monitored characteristics, wherein the characterization of the at least one load is communicated to the controller, which based on the provided characterization provides commands to the plurality of power blocks with instructions regarding the power source to be provided to the at least one load.

* * * * *